(12) United States Patent
Kim et al.

(10) Patent No.: US 8,172,258 B2
(45) Date of Patent: May 8, 2012

(54) RAMP APPARATUS FOR CURTAIN AIRBAG FOR VEHICLE

(75) Inventors: Eung Seo Kim, Incheon-si (KR); Dae Young Kwak, Yongin-si (KR); Jae Haeng Yoo, Yongin-si (KR); Seung Man Kim, Wonju-si (KR); Dong Jun Lee, Wonju-si (KR); Do Hun Kim, Siheung-si (KR)

(73) Assignees: Hyundai Motor Company, Seoul (KR); Autoliv Development AB, Vargarda (SE)

( * ) Notice: Subject to any disclaimer, the term of this patent is extended or adjusted under 35 U.S.C. 154(b) by 117 days.

(21) Appl. No.: 12/767,539

(22) Filed: Apr. 26, 2010

(65) Prior Publication Data

US 2011/0101656 A1    May 5, 2011

(30) Foreign Application Priority Data

Oct. 30, 2009    (KR) .......................... 10-2009-0104070

(51) Int. Cl.
*B60R 21/21* (2011.01)
*B60R 21/213* (2011.01)

(52) U.S. Cl. .................. 280/728.2; 280/730.2

(58) Field of Classification Search ............... 280/728.2, 280/730.2; 403/13, 14; 24/457, 458, 191, 24/171; 248/95, 166, 909, 301, 304, 305, 248/306, 308, 220.31, 220.41, 225.21, 300
See application file for complete search history.

(56) References Cited

U.S. PATENT DOCUMENTS

| | | | | |
|---|---|---|---|---|
| 5,899,486 A * | 5/1999 | Ibe | ............................. | 280/728.2 |
| 6,149,185 A * | 11/2000 | White et al. | ............... | 280/728.2 |
| 6,254,123 B1 * | 7/2001 | Urushi et al. | ............... | 280/730.2 |
| 6,305,707 B1 * | 10/2001 | Ishiyama et al. | ........... | 280/728.2 |
| 6,796,576 B2 * | 9/2004 | Aoki et al. | .................. | 280/730.2 |
| 6,974,151 B2 * | 12/2005 | Ochiai et al. | ............... | 280/728.2 |
| 7,156,413 B2 * | 1/2007 | Fischer et al. | .............. | 280/728.2 |
| 7,331,598 B2 * | 2/2008 | Inazu et al. | ................. | 280/728.2 |
| 7,654,559 B2 * | 2/2010 | Hidaka et al. | .............. | 280/728.2 |
| 7,887,086 B2 * | 2/2011 | Kalandek | .................... | 280/728.2 |
| 7,896,389 B2 * | 3/2011 | Jang et al. | ................... | 280/730.2 |
| 7,992,892 B2 * | 8/2011 | Jaramillo | ....................... | 280/729 |
| 2004/0046366 A1 * | 3/2004 | Ochiai et al. | ................. | 280/728.2 |
| 2005/0029778 A1 * | 2/2005 | Weber et al. | ................ | 280/728.2 |
| 2007/0063490 A1 * | 3/2007 | Minamikawa | ............. | 280/728.2 |
| 2007/0241543 A1 * | 10/2007 | Jang et al. | ................... | 280/730.2 |
| 2008/0061535 A1 * | 3/2008 | Everard et al. | ............. | 280/728.2 |
| 2008/0284142 A1 * | 11/2008 | Cheal et al. | ................. | 280/730.2 |

* cited by examiner

*Primary Examiner* — Paul N. Dickson
*Assistant Examiner* — Joseph Rocca
(74) *Attorney, Agent, or Firm* — Morgan, Lewis & Bockius LLP

(57) ABSTRACT

A ramp apparatus for a curtain airbag for a vehicle, positioned between a headliner and a vehicular body panel such that the curtain airbag is deployed through a matching part formed between the headliner and a pillar trim, may include a support ramp fastened to the vehicular body panel and receiving a lower portion of the folded curtain airbag, and a deployment ramp extending from a first end of the support ramp to enclose a portion of the curtain airbag therein and deploying towards the interior of the vehicle to seal a gap between the vehicular body panel and the pillar trim by expansive pressure of the curtain airbag in the event of a vehicle collision.

10 Claims, 5 Drawing Sheets

RAMP APPARATUS FOR CURTAIN AIRBAG FOR VEHICLE

CROSS-REFERENCE TO RELATED APPLICATION

The present application claims priority to Korean Patent Application No. 10-2009-0104070, filed on Oct. 30, 2009, the entire contents of which is incorporated herein for all purposes by this reference.

BACKGROUND OF THE INVENTION

1. Field of the Invention

The present invention relates, in general, to ramp apparatuses for curtain airbags for vehicles and, more particularly, to a ramp apparatus for a curtain airbag for a vehicle, which seals a gap between a vehicular body panel and a pillar trim when the curtain airbag is deployed.

2. Description of Related Art

Generally, airbag systems for protecting a passenger from a side collision of a vehicle are classified into a curtain airbag for protecting the head of a passenger and a side airbag for protecting the side of a passenger.

Among them, the curtain airbag is installed along the side upper end in a vehicle in such a way as to be deployed in a curtain manner in the event of a vehicle collision. The curtain airbag can protect a passenger even when the vehicle is overturned as well as in the event of a side collision, thus providing a high degree of safety to the passenger. For example, when an inflator is operated in response to a collision signal, gas exploded in the inflator flows into the curtain airbag, thus inflating the curtain airbag. The inflated curtain airbag is deployed into the space of a vehicle to protect a passenger in the case of a vehicle collision.

Especially, as shown in FIG. 5, a ramp bracket 30 having a bent part 31 of FIG. 5A is mounted in a space between a headliner 10 and a vehicular body panel 50 to guide the deployment of a curtain airbag 20. Thus, when the curtain airbag 20 is inflated as a result of a vehicle collision, the inflated curtain airbag 20 pushes a matching part 11 connected between the headliner 10 and a pillar trim 40 with strong pressure. At this time, the curtain airbag 20 is deployed through the open gap of the matching part 11.

However, when the curtain airbag 20 is inflated in the space between the headliner 10 and the vehicular body panel 50 (the dotted lines of FIG. 5), the pillar trim 40 is removed from the vehicular body panel 50, so that the curtain airbag 20 may not be deployed through the matching part between the headliner 10 and the pillar trim 40, but may be deployed to a space between the pillar trim 40 and the vehicular body panel 50 or the curtain airbag 20 may be caught by the pillar trim 40, so that the curtain airbag 20 may not be deployed smoothly. Further, since the conventional ramp bracket 30 is made of a steel material, FMH impact performance is poor due to the excessive rigidity of the steel material.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a ramp apparatus for a curtain airbag for a vehicle, which is intended to prevent the curtain airbag from being deployed to a space between a vehicular body panel and a pillar trim.

In an aspect of the present invention, a ramp apparatus for a curtain airbag for a vehicle, positioned between a headliner and a vehicular body panel such that the curtain airbag is deployed through a matching part formed between the headliner and a pillar trim, may include a support ramp fastened to the vehicular body panel and receiving a lower portion of the folded curtain airbag, and a deployment ramp extending from a first end of the support ramp to enclose a portion of the curtain airbag therein and deploying towards the interior of the vehicle to seal a gap between the vehicular body panel and the pillar trim by expansive pressure of the curtain airbag in the event of a vehicle collision.

The support ramp may be thicker than the deployment ramp, wherein the support ramp and the deployment ramp are monolithically integrated into a single structure.

The elasticity of the support ramp may be larger than the elasticity of the deployment ramp, wherein the support ramp and the deployment ramp are monolithically integrated into a single structure.

The support ramp may include a plate coupled to the vehicular body panel, and a bent part, a first end thereof extending from a lower end of the plate in a shape of a hook and a second end thereof being connected to the deployment ramp, thus surrounding the portion of the folded curtain airbag.

A sum of perimeters of the bent part and the deployment may be larger than a distance between the pillar trim and the vehicular body panel.

At least a support piece may protrude from the bent part and may be supported by the vehicular body panel, wherein the at least a support piece protrudes from the bent part in a tangential direction of the bent part towards the vehicular body panel.

The plate may include a hole so that an end of a fastening member is inserted thereinto and secures the plate to the vehicular body panel, wherein a reinforcing piece having a hole is disposed onto the plate so that an end of the fastening piece passes through the holes of the plate and the reinforcing piece and secures the reinforcing piece and the plate to the vehicular body panel.

The fastening member may include a fastening piece protruding from the vehicular body panel and passing a slot formed in the plate so that an end of the fastening piece is bent to secure the plate to the vehicular body panel, wherein a reinforcing piece having a slot is disposed onto the plate so that an end of the fastening piece passes through the slots of the plate and the reinforcing piece and is bent to secure the reinforcing piece and the plate to the vehicular body panel.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
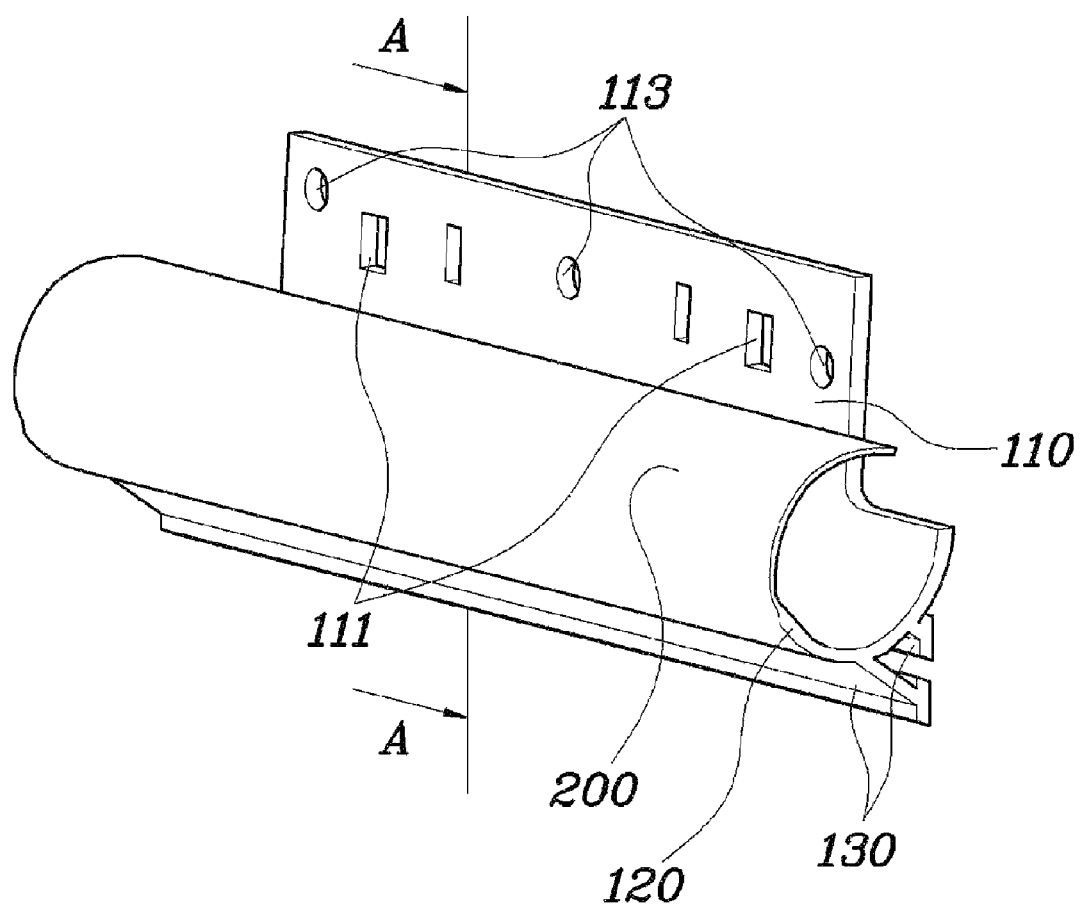
FIG. 1 is a perspective view illustrating an exemplary ramp apparatus for a curtain airbag for a vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
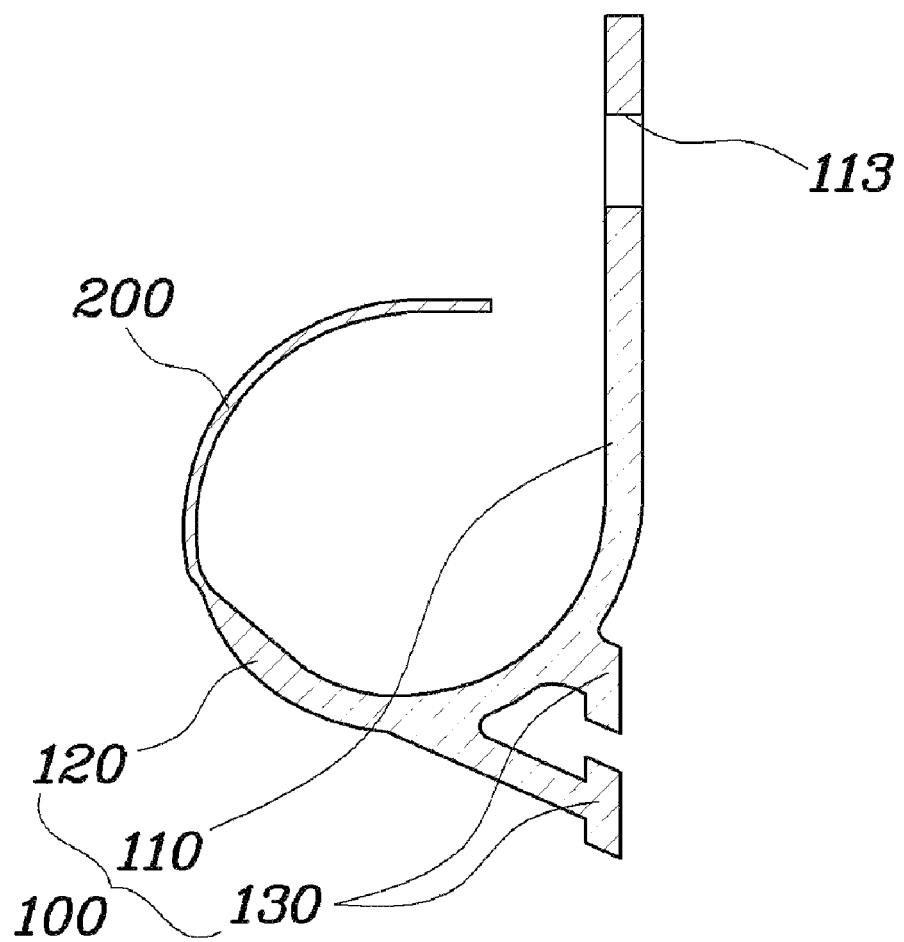
FIG. 2 is a sectional view taken along line "A-A" of FIG. 1.
Figure 3:
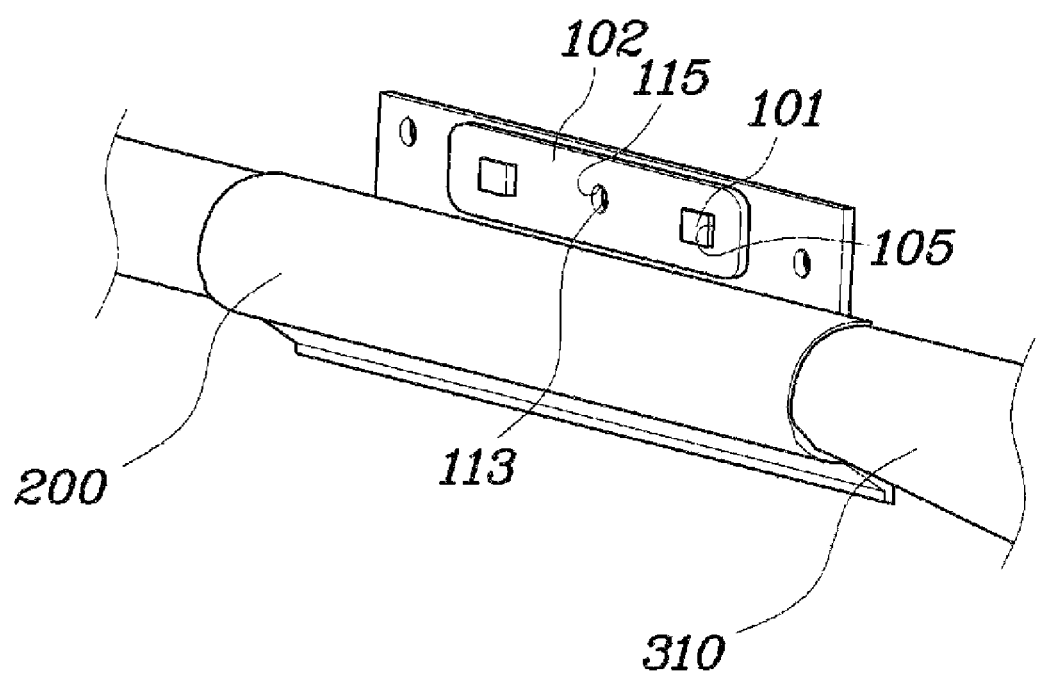
FIG. 3 is a perspective view illustrating a curtain airbag mounted to the exemplary ramp apparatus for the curtain airbag for the vehicle according to the present invention.

As shown in FIGS. 1 to 3, a ramp apparatus for a curtain airbag for a vehicle according to an exemplary embodiment of the present invention includes a deployment ramp 200 which seals a space between a pillar trim 340 and a vehicular body panel 330 when a curtain airbag 310 is deployed, thus preventing the curtain airbag 310 from being caught by the pillar trim 340, and preventing the curtain airbag 310 from being deployed to the space between the vehicular body panel 330 and the pillar trim 340.

That is, the ramp apparatus for the curtain airbag is positioned between a headliner 320 and the vehicular body panel 330, thus normally restraining the curtain airbag 310, which may be deployed to the interior of the vehicle, such that the curtain airbag 310 is folded. Further, the ramp apparatus allows the curtain airbag 310 to be smoothly deployed through a matching part 103 between the headliner 320 and the pillar trim 340 when the curtain airbag 310 is deployed.

To this end, the ramp apparatus for the curtain airbag includes a support ramp 100 and the deployment ramp 200. The support ramp 100 surrounds the lower portion of the curtain airbag 310 which is folded. The deployment ramp 200 extends from one end of the support ramp 100 in such a way as to be curved, thus surrounding the upper portion of the curtain airbag 310.

Preferably, the support ramp 100 is formed to be thicker than the deployment ramp 200. This causes the support ramp 100 which is secured to the vehicular body panel 330 to have higher rigidity, and causes the deployment ramp 200 which is deformed by the expansive pressure of the curtain airbag 310 to have lower rigidity.

When the curtain airbag 310 is deployed as a result of a vehicle collision, even if the pillar trim 340 is removed from the vehicular body panel 330, so that a gap is formed between the vehicular body panel 330 and the pillar trim 340, the deployment ramp 200 is bent by the expansive pressure of the curtain airbag 310 and seals the gap between the vehicular body panel 330 and the pillar trim 340, thus preventing the curtain airbag 310 from being caught by the pillar trim 340, and preventing the curtain airbag 310 from being deployed to the gap between the vehicular body panel 330 and the pillar trim 340.

According to the present embodiment of the present invention, a difference in rigidity between the support ramp 100 and the deployment ramp 200 is realized using a difference in thickness between the support ramp 100 and the deployment ramp 200. However, without being limited to the present embodiment, any shape is possible as long as only the deployment ramp 200 may be bent by the expansive pressure of the curtain airbag 310.

For example, the support ramp 100 made of a high rigidity material and the deployment ramp 200 made of a low rigidity material may be integrated into a single structure through double injection molding. In this case, in the event of a vehicle collision, the deployment ramp 200 is bent by the expansive pressure of the curtain airbag 310, thus sealing the gap between the vehicular body panel 330 and the pillar trim 340.

The support ramp 100 is secured to the vehicular body panel 330 to surround the lower portion of the folded curtain airbag 310. The support ramp 100 includes a plate 110 and a bent part 120. The plate 110 is secured to the vehicular body panel 330. One end of the bent part 120 extends from the lower end of the plate 110 in the shape of a hook, while the other end is connected to the deployment ramp 200.

Further, slots 111 are formed in the plate 110 so that a fastening member is fixedly inserted into the slots 111. According to the present embodiment, the fastening member includes fastening pieces 101 which protrude from the vehicular body panel 330 and a reinforcing piece 102 which restrains the fastening pieces 101. That is, the reinforcing piece 102 having reinforcing slots 105 is placed on the plate 110. An associated end of each fastening piece 101 protruding from the vehicular body panel 330 passes through the corresponding slot 111 of the plate 110 and the corresponding reinforcing slot 105 of the reinforcing piece 102, and thereafter is bent, so that the plate 110 is fastened to the vehicular body panel 330.

In an exemplary embodiment of the present invention, the fastening member may use general fastening means such as a bolt or screw, in addition to the fastening pieces 101 and the reinforcing piece 102. The plate 110 may include holes 113 and the reinforcing piece 102 may include corresponding holes 115. The plate 110 may be fastened to the vehicular body panel 330 via the fastening means passing through the holes 113 and 115.

A support piece 130 protrudes downwards from the bent part 120 to connect the ramp apparatus for the curtain airbag to the vehicular body panel 330. The support piece 130 protrudes obliquely from the curved surface of the bent part 120, and an associated end of the support piece 130 is in contact with the vehicular body panel 330.

Thus, the upper portion of the ramp apparatus for the curtain airbag is fastened through the fastening member to the vehicular body panel 330, while the lower portion of the ramp apparatus is supported by the vehicular body panel 330 via the support piece 130. Consequently, the ramp apparatus for the curtain airbag may be stably supported on the vehicular body panel 330.

Preferably, the support ramp 100 and the deployment ramp 200 may be integrated into a single structure using plastic. Especially, among several kinds of plastics, a plastic capable of easily absorbing shocks is selected and applied to the support ramp 100 and the deployment ramp 200. Therefore, the ramp apparatus of the present invention solves the problem of the related art which is poor in FMH impact performance because of a conventional ramp bracket made of a steel material having excessive rigidity. In another embodiment of the present invention, the support ramp 100 and the deployment ramp 200 may be integrated into a single structure using aluminum.

The operation of the ramp apparatus according to an exemplary embodiment of the present invention constructed as described above will be described below.

Figure 4:
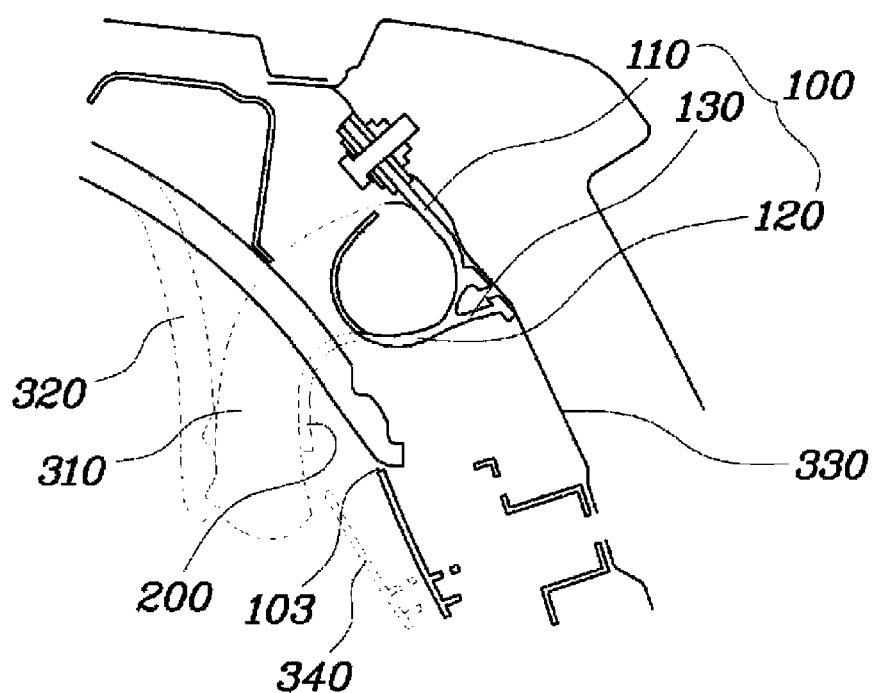
FIG. 4 is a view illustrating the operation of the exemplary ramp apparatus for the curtain airbag for the vehicle according to the present invention.
Figure 5:
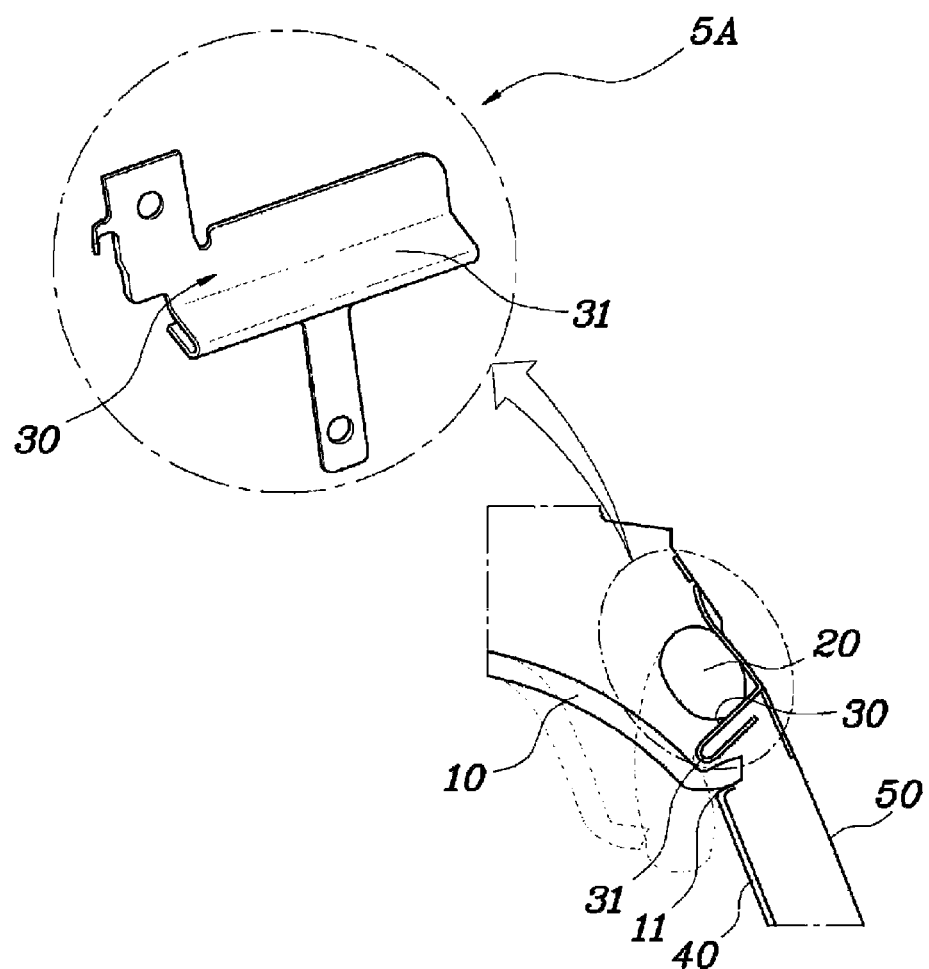
FIG. 5 is a view illustrating the construction of a conventional curtain airbag for a vehicle.

As shown in FIG. 4, when a vehicle which is being driven on a road with a driver or passenger riding in the vehicle is involved in a side collision or the vehicle is overturned, the curtain airbag 310 installed in the vehicle starts to inflate.

If the curtain airbag 310 is inflated, the matching part 103 between the headliner 320 and the pillar trim 340 is opened by the expansive pressure of the curtain airbag 310. As shown by the dotted lines in FIG. 4, the deployment ramp 200 is bent by the expansive pressure of the curtain airbag 310, so that the curtain airbag 310 is deployed to the interior of the vehicle.

At this time, even if the pillar trim 340 is removed from the vehicular body panel 330 because of a vehicle collision, the deployment ramp 200 is bent by the expansive pressure of the curtain airbag 310, thus sealing the gap between the vehicular body panel 330 and the pillar trim 34Q, therefore allowing the curtain airbag 310 guided by the deployment ramp 200 to be smoothly deployed to the interior of the vehicle.

As is apparent from the above description, a ramp apparatus for a curtain airbag for a vehicle according to the present invention is advantageous in that, when the curtain airbag is deployed, a deployment ramp seals a gap between a vehicular body panel and a pillar trim, thus preventing the curtain airbag from being caught by the pillar trim, preventing the curtain airbag from being deployed to the gap between the vehicular body panel and the pillar trim, and enabling the curtain airbag to be smoothly and reliably deployed.

Further, a ramp apparatus for a curtain airbag for a vehicle according to the present invention is advantageous in that a support ramp and a deployment ramp are integrated into a single structure using plastic having superior shock absorbing ability, so that the cost and weight of a product can be considerably reduced. As a result, the ramp apparatus of the present invention overcomes poor FMH impact performance of the related art resulting from excessive rigidity of a steel material.

For convenience in explanation and accurate definition in the appended claims, the terms "upper", "lower" and "interior" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A ramp apparatus for a curtain airbag for a vehicle, positioned between a headliner and a vehicular body panel such that the curtain airbag is deployed through a matching part formed between the headliner and a pillar trim, the ramp apparatus comprising:
a support ramp fastened to the vehicular body panel and receiving a lower portion of the folded curtain airbag; and
a deployment ramp extending from a first end of the support ramp to enclose a portion of the curtain airbag therein and deploying towards the interior of the vehicle to fill a gap between the vehicular body panel and the pillar trim by expansive pressure of the curtain airbag in the event of a vehicle collision;
wherein the support ramp includes:
a plate coupled to the vehicular body panel; and
a bent part, a first end thereof extending from a lower end of the plate in a shape of a hook and a second end thereof being connected to the deployment ramp, thus surrounding the portion of the folded curtain airbag;
wherein at least a support piece protrudes from the bent part and is supported by the vehicular body panel; and
wherein the at least a support piece protrudes from the bent part in a tangential direction of the bent part towards the vehicular body panel.

2. The ramp apparatus as set forth in claim 1, wherein the support ramp is thicker than the deployment ramp.

3. The ramp apparatus as set forth in claim 1, wherein the support ramp and the deployment ramp are monolithically integrated into a single structure.

4. The ramp apparatus as set forth in claim 1, wherein the support ramp is more rigid than the deployment ramp.

5. The ramp apparatus as set forth in claim 4, wherein the support ramp and the deployment ramp are monolithically integrated into a single structure.

6. The ramp apparatus as set forth in claim 1, wherein a sum of perimeters of the bent part and the deployment ramp is equal to or larger than a distance between the pillar trim and the vehicular body panel.

7. The ramp apparatus as set forth in claim 1, wherein the plate includes a hole so that an end of a fastening member is inserted thereinto and secures the plate to the vehicular body panel.

8. The ramp apparatus as set forth in claim 7, wherein a reinforcing piece having a hole is disposed onto the plate so that an end of the fastening piece passes through the holes of the plate and the reinforcing piece and secures the reinforcing piece and the plate to the vehicular body panel.

9. The ramp apparatus as set forth in claim 1, wherein the fastening member includes a fastening piece protruding from the vehicular body panel and passing a slot formed in the plate so that an end of the fastening piece is bent to secure the plate to the vehicular body panel.

10. The ramp apparatus as set forth in claim 9, wherein a reinforcing piece having a slot is disposed onto the plate so that an end of the fastening piece passes through the slots of the plate and the reinforcing piece and is bent to secure the reinforcing piece and the plate to the vehicular body panel.

* * * * *